(12) United States Patent
Zhang et al.

(10) Patent No.: US 11,947,958 B2
(45) Date of Patent: Apr. 2, 2024

(54) METHOD, DEVICE, AND PROGRAM PRODUCT FOR MANAGING OBJECT IN SOFTWARE DEVELOPMENT PROJECT

(71) Applicant: EMC IP Holding Company LLC, Hopkinton, MA (US)

(72) Inventors: Chen Zhang, Shanghai (CN); Lei Lei, Shanghai (CN); Dazhi Dong, Shanghai (CN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/559,087

(22) Filed: Dec. 22, 2021

(65) Prior Publication Data
US 2022/0405095 A1    Dec. 22, 2022

(30) Foreign Application Priority Data
Jun. 16, 2021  (CN) .......................... 202110665363.7

(51) Int. Cl.
*G06F 8/77* (2018.01)
(52) U.S. Cl.
CPC ..................................... *G06F 8/77* (2013.01)
(58) Field of Classification Search
None
See application file for complete search history.

(56) References Cited

U.S. PATENT DOCUMENTS

| | | | |
|---|---|---|---|
| 7,383,274 B2 * | 6/2008 | Pearce | G06F 16/10 |
| 8,539,282 B1 | 9/2013 | Kabanov et al. | |
| 8,627,287 B2 | 1/2014 | Fanning et al. | |
| 9,058,576 B2 | 6/2015 | Attar et al. | |
| 10,248,551 B2 | 4/2019 | Jerrard-Dunne et al. | |
| 2008/0104140 A1 * | 5/2008 | Vierich | G06F 8/71 |

(Continued)

OTHER PUBLICATIONS

T. Ji, J. Pan, L. Chen and X. Mao, "Identifying Supplementary Bug-fix Commits," 2018 IEEE 42nd Annual Computer Software and Applications Conference (COMPSAC), Tokyo, Japan, 2018, pp. 184-193, doi: 10.1109/COMPSAC.2018.00031. (Year: 2018).*

(Continued)

*Primary Examiner* — Andrew M. Lyons
(74) *Attorney, Agent, or Firm* — BainwoodHuang

(57) ABSTRACT

A technique manages objects in a software development project. In particular, in response to receiving a commit request for committing a group of objects, a group of historical commit requests associated with the group of objects are acquired based on a commit history, wherein historical commit requests in the group of historical commit requests involve the group of objects. A candidate object is selected from at least one object involved in the historical commit requests that is different from the group of objects. An association relationship between the candidate object and the group of objects is determined. The candidate object is identified as a missing object in response to determining that the association relationship satisfies a predetermined condition, the missing object indicating an object associated with the commit request but not included in the commit request. Accordingly, objects that are missing in a commit request can be automatically checked.

23 Claims, 9 Drawing Sheets

(56) References Cited

U.S. PATENT DOCUMENTS

| | | | | |
|---|---|---|---|---|
| 2009/0249295 | A1* | 10/2009 | Poole | G06F 8/71 |
| | | | | 717/120 |
| 2013/0031215 | A1* | 1/2013 | Macrae | H04L 65/80 |
| | | | | 709/219 |
| 2014/0173574 | A1* | 6/2014 | Schmidt | G06F 8/43 |
| | | | | 717/143 |
| 2014/0289704 | A1* | 9/2014 | Viswanathan | G06F 8/65 |
| | | | | 717/123 |
| 2015/0293699 | A1* | 10/2015 | Bromley | G06F 3/0641 |
| | | | | 711/161 |
| 2018/0136933 | A1* | 5/2018 | Kogan | G06F 8/433 |
| 2020/0104121 | A1* | 4/2020 | Morgan | G06F 16/2379 |
| 2020/0257597 | A1* | 8/2020 | Kolesnik | G06F 11/3624 |

OTHER PUBLICATIONS

T. Zimmermann, A. Zeller, P. Weissgerber and S. Diehl, "Mining version histories to guide software changes," in IEEE Transactions on Software Engineering, vol. 31, No. 6, pp. 429-445, Jun. 2005, doi: 10.1109/TSE.2005.72. (Year: 2005).*

T. Dhaliwal, F. Khomh, Y. Zou and A. E. Hassan, "Recovering commit dependencies for selective code integration in software product lines," 2012 28th IEEE International Conference on Software Maintenance (ICSM), Trento, Italy, 2012, pp. 202-211, doi: 10.1109/ICSM.2012.6405273. (Year: 2012).*

* cited by examiner

FIG. 7

METHOD, DEVICE, AND PROGRAM PRODUCT FOR MANAGING OBJECT IN SOFTWARE DEVELOPMENT PROJECT

CROSS-REFERENCE TO RELATED APPLICATION

This application claims priority to Chinese Patent Application No. CN202110665363.7, on file at the China National Intellectual Property Administration (CNIPA), having a filing date of Jun. 16, 2021, and having "METHOD, DEVICE, AND PROGRAM PRODUCT FOR MANAGING OBJECT IN SOFTWARE DEVELOPMENT PROJECT" as a title, the contents and teachings of which are herein incorporated by reference in their entirety.

TECHNICAL FIELD

Implementations of the present disclosure relate to software development and, more specifically, to a method, a device, and a computer program product for managing objects in a software development project.

BACKGROUND

With the development of software development technologies, the number of objects involved in a software development project is now increasingly high. For large software, a software development project may involve thousands or even tens of thousands of objects. During the development and update of a software product, software engineers may update one or more objects and use commit requests to commit the updated objects to a code base. It will be understood that there are complex association relationships between various objects, and the software engineers may forget to modify some objects, which in turn leads to some objects missing in the commit requests. At this point, how to manage objects in a software development project more effectively becomes a hot topic of research.

SUMMARY OF THE INVENTION

Therefore, it is desirable to develop and implement a technical solution of managing objects in a software development project in a more effective manner. It is expected that this technical solution will be able to manage multiple objects in a software development project in a more convenient and effective manner. Further, it is expected that the objects missing in a commit request can be automatically checked and thus the efficiency of the software development process can be improved.

According to a first aspect of the present disclosure, a method for managing objects in a software development project is provided. In this method, in response to receiving a commit request for committing a group of objects in the software development project, a group of historical commit requests associated with the group of objects are acquired based on a commit history of the software development project, wherein historical commit requests in the group of historical commit requests involve the group of objects. A candidate object is selected from at least one object involved in the historical commit requests that is different from the group of objects. An association relationship between the candidate object and the group of objects is determined. The candidate object is identified as a missing object in response to determining that the association relationship satisfies a predetermined condition, wherein the missing object indicates an object associated with the commit request but not included in the commit request.

According to a second aspect of the present disclosure, an electronic device is provided, including: at least one processor; a volatile memory; a memory coupled to the at least one processor, wherein the memory has instructions stored therein which, when executed by the at least one processor, cause the device to perform the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of examples rather than limitation. In the accompanying drawings, FIG. 1 schematically illustrates a block diagram of an application environment in which example implementations of the present disclosure may be implemented;

FIG. 7 schematically illustrates a block diagram of a user interface for displaying a set of missing objects according to an example implementation of the present disclosure;

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred implementations of the present disclosure will be described in more detail with reference to the accompanying drawings. Although preferred implementations of the present disclosure are illustrated in the accompanying drawings, it should be understood that the present disclosure may be implemented in various forms and should not be limited by the implementations illustrated herein. Instead, these implementations are provided in order to make the present disclosure more thorough and complete, and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," and the like may refer to different or identical objects. Other explicit and implicit definitions may also be included below.

Figure 1:
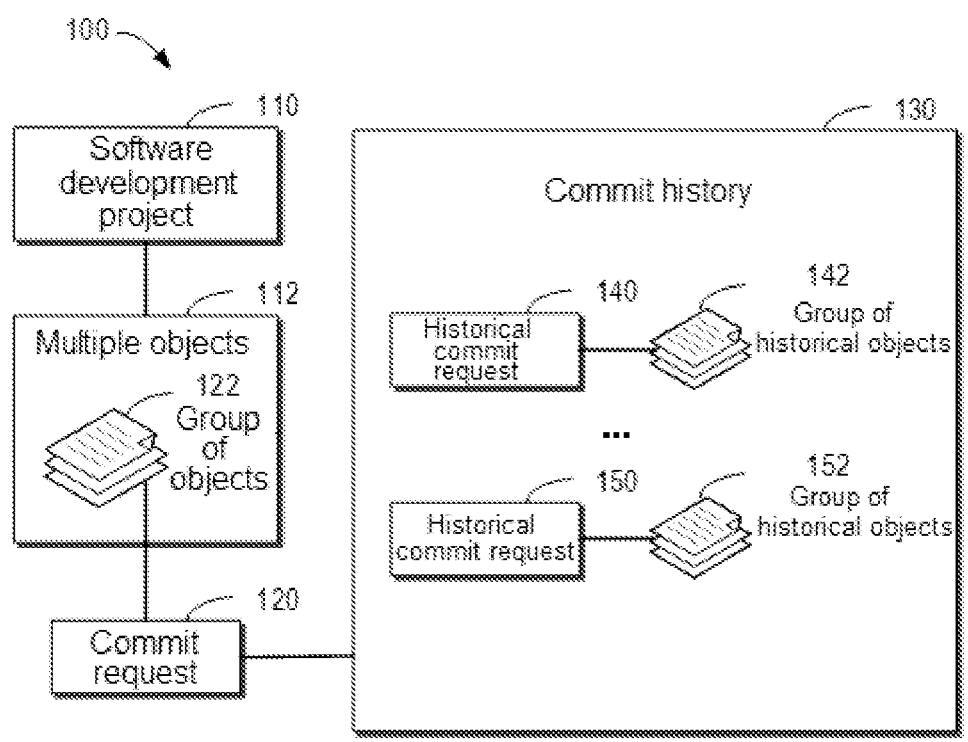

For ease of description, an application environment according to an example implementation of the present disclosure will be first described with reference to FIG. 1. FIG. 1 schematically illustrates a block diagram of application environment 100 in which example implementations of the present disclosure may be implemented. As shown in FIG. 1, software development project 110 may involve multiple objects 112 (e.g., several thousands). As the software development process proceeds, a software engineer may update a group of objects 122 (e.g., 10 objects) and use commit request 120 to commit the group of objects 122 that have been updated to a code base. The code base may include commit history 130 to store historical information in the course of historical development in an incremental manner. For example, historical commit request 140 may involve a group of historical objects 142, . . . , and historical commit request 150 may involve a group of historical objects 152.

It will be understood that multiple objects 112 may involve multiple types. For example, the objects may include files and/or directories. Here, files may include, for example, software code files, library files, configuration files, and the like in one or more formats. Directories may include, for example, directories for storing the various kinds of files mentioned above and/or directories for test cases, etc. Since software development project 110 may involve thousands of or even more objects, the software engineer may forget to update some objects during the development process. For example, the software engineer may forget to commit a certain file. For another example, the software engineer may add to a file a statement that invokes a test case, but forget to copy the test case to a corresponding directory. This results in a missing directory in the commit request.

At present, technical solutions have been proposed to check commit requests based on manual approaches. For example, a checklist can be created and the software engineer needs to verify whether the commit request includes all the required objects one by one according to the configuration in the checklist. However, the checklist-based solutions require a lot of manual operations, and errors during the checklist creation and the manual operations may result in the failure to find missing objects in the commit request. Thus, it is expected that a technical solution to automatically check missing objects in commit requests can be provided, and it is expected that this technical solution can be compatible with existing software development systems and thus improve the efficiency of software development.

Figure 2:
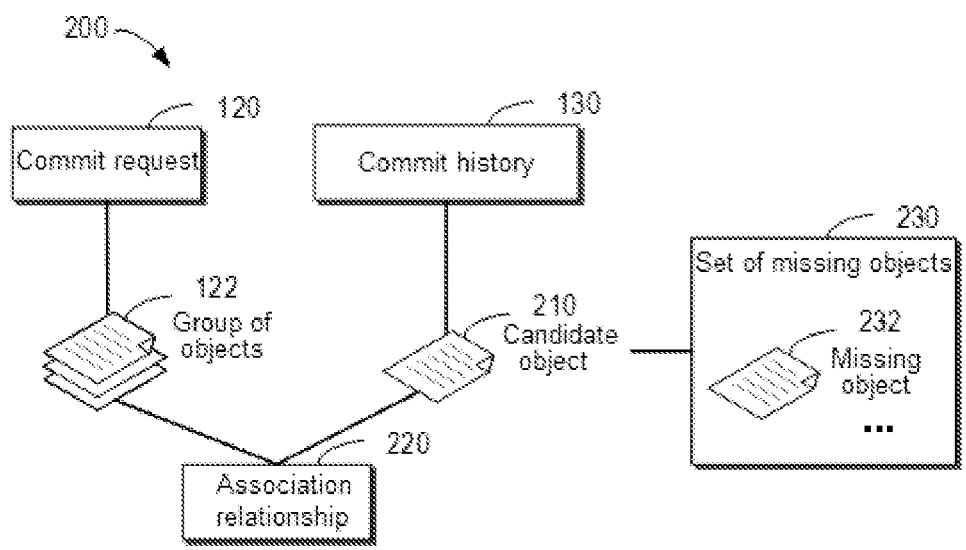
FIG. 2 schematically illustrates a block diagram of a process for managing objects in a software development project according to an example implementation of the present disclosure.

In order to at least partially eliminate the shortcomings in the above technical solutions, a method for managing objects in a software development project is provided according to an example implementation of the present disclosure. An overview of the present disclosure will first be described with reference to FIG. 2. FIG. 2 schematically illustrates a block diagram of process 200 for managing objects in a software development project according to an example implementation of the present disclosure. As shown in FIG. 2, when commit request 120 involving a group of objects 122 is received, one or more candidate objects 210 can be determined from commit history 130 and association relationship 220 between the group of objects 122 and candidate object 210 can be determined. If association relationship 220 satisfies a predetermined condition, this candidate object 210 is considered as a potential missing object and this candidate object 210 is added to a set of missing objects 230 as a missing object.

With the example implementation of the present disclosure, candidate object 210 that has association relationship 220 (e.g., having been committed simultaneously several times) with the group of objects 122 can be searched for from commit history 130 so that a software engineer can verify whether there is an error in commit request 120. In this way, the manual labor load in the software development process can be reduced, and the efficiency of the software development process can be improved.

Figure 3:
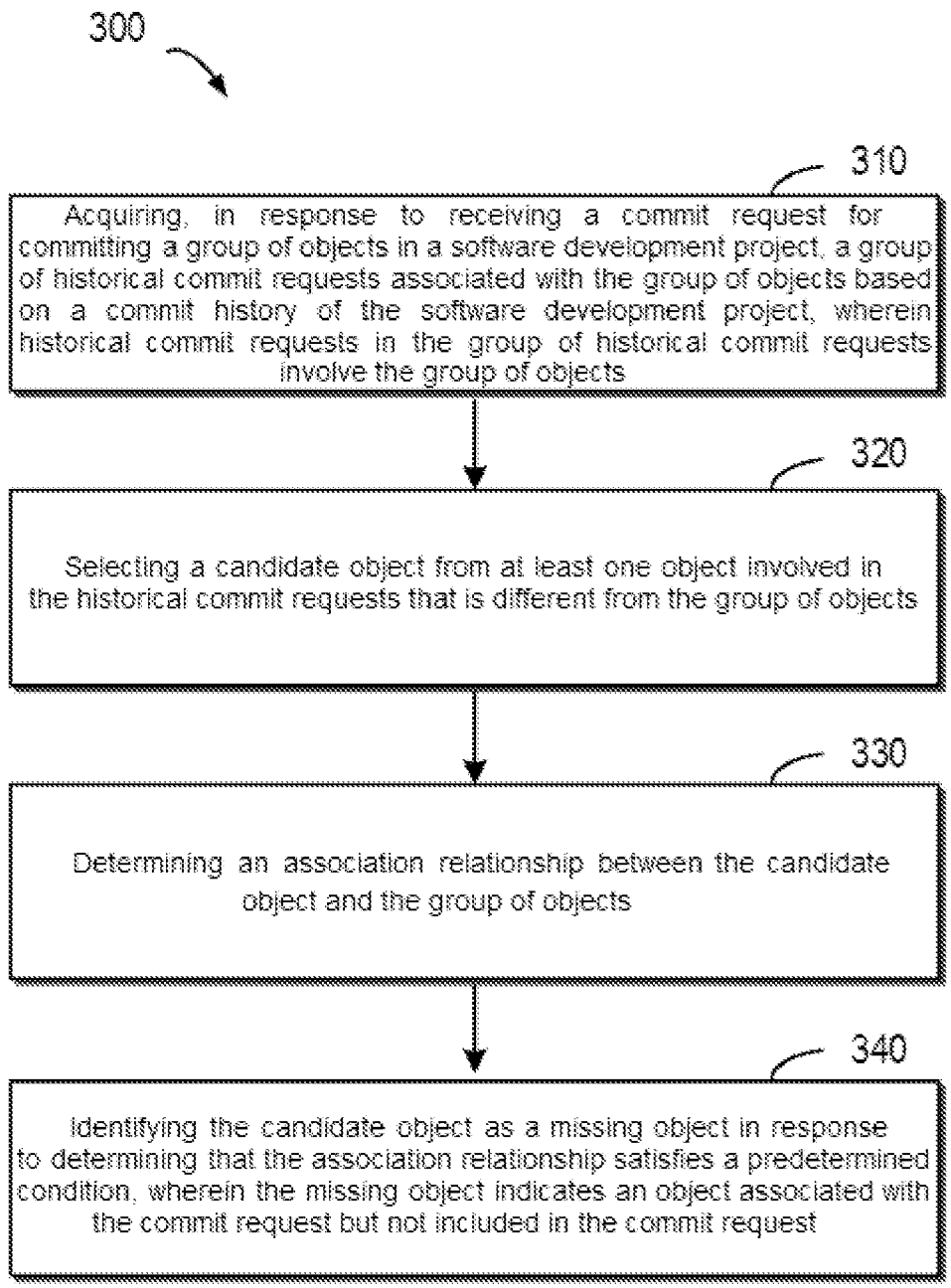
FIG. 3 schematically illustrates a flow chart of a method for managing objects in a software development project according to an example implementation of the present disclosure.

Hereinafter, more details of an example implementation according to the present disclosure will be described with reference to FIG. 3. FIG. 3 schematically illustrates a flow chart of method 300 for managing objects in a software development project according to an example implementation of the present disclosure. As shown in FIG. 3, at block 310, in response to receiving commit request 120 for committing a group of objects 122 in a software development project, a group of historical commit requests associated with the group of objects 122 are determined based on commit history 130 of the software development project. Here, each historical commit request in the group of historical commit requests includes identifiers of a group of objects committed in that historical commit request.

According to an example implementation of the present disclosure, the group of historical commit requests can be determined in various ways. For example, all of the historical commit requests in commit history 130 can be used as the group of historical commit requests. At this point, the group of historical commit requests may include historical commit request 140, . . . , and historical commit request 150. When commit history 130 includes a large number of historical commit requests, subsequent processing will involve a large amount of computation, and thus commit history 130 can be filtered to find one or more historical commit requests that are more relevant to current commit request 120.

According to an example implementation of the present disclosure, commit request 120 can be compared with each of the multiple historical commit requests to determine the group of historical commit requests. Specifically, if it is determined that a group of historical objects involved by a particular historical commit request has an intersection with the group of objects 122, this historical commit request is added to the group of historical commit requests; otherwise, the method continues to process the next historical commit request in commit history 130. According to an example implementation of the present disclosure, the following Equation 1 can be used to determine the group of historical commit requestsH'.

$$H' \leftarrow \{S_{PR} | S_{PR} \cap S_{new} \neq \emptyset, S_{PR} \in H\} \quad \text{Equation 1}$$

where $S_{new}$ denotes current commit request 120, H denotes all historical commit requests in commit history 130, and $S_{PR}$ denotes one historical commit request in H. Equation 1 indicates that if there is a non-empty intersection between historical commit request $S_{PR}$ and current commit request $S_{new}$, historical commit request $S_{PR}$ is added to the group of historical commit requestsH'.

Figure 4:
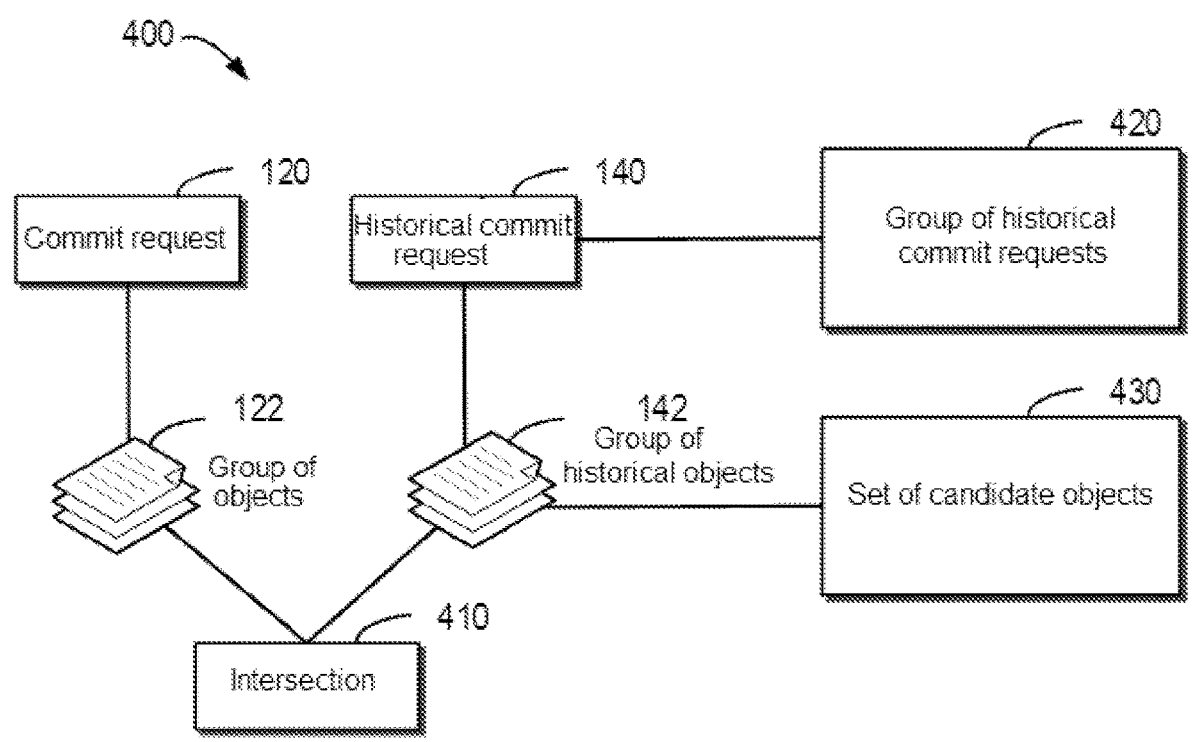
FIG. 4 schematically illustrates a block diagram of a process for acquiring a set of candidate objects according to an example implementation of the present disclosure.

Hereinafter, more details about the comparison will be described with reference to FIG. 4. FIG. 4 schematically illustrates a block diagram of process 400 for acquiring a set of candidate objects according to an example implementation of the present disclosure. As shown in FIG. 4, current commit request 120 involves a group of objects 122 and historical commit request 140 involves a group of historical objects 142. As shown in FIG. 4, if there is intersection 410 between the group of objects 122 and the group of historical objects 142, historical commit request 140 can be added to the group of historical commit requests 420. Further, objects in the group of historical objects 142 other than those in the intersection can be added to a set of candidate objects 430. In general, multiple objects committed simultaneously in one commit request usually have a strong correlation, and multiple objects never committed simultaneously in one commit request usually have a weak correlation. Thus, based on whether the group of objects 122 and the group of historical objects 142 have an intersection, irrelevant historical commit requests can be filtered out, thus reducing the computational amount of subsequent processing.

Returning to FIG. 3, at block 320, a candidate object can be selected from at least one object involved in the historical commit requests that is different from the group of objects. In other words, candidate object 210 can be selected from the set of candidate objects 430. According to an example implementation of the present disclosure, candidate objects in the set of candidate objects 430 can be processed one by one. For example, the association relationship between each candidate object and the group of objects 122 involved by current commit request 120 can be determined.

At block 330, association relationship 220 between candidate object 210 and the group of objects 122 is determined. To facilitate the description, the following support degree function is first defined. According to an example implementation of the present disclosure, a degree of support indicates the number of occurrences of a set of objects in a group of historical commit requests. The degree of support can be determined based on the following Equation 2.

$$\text{support}(S,H')=|\{S_{PR}|S \subseteq S_{PR}, S_{PR} \in H'\}| \quad \text{Equation 2}$$

where S denotes a set of objects, H' denotes a group of historical commit requests, $S_{PR}$ denotes a historical commit request in H', and support(S, H') denotes the number of occurrences of S in H'.

Suppose that S includes 2 objects: {Object 1, Object 2}, wherein H' includes the following 3 historical commit requests:

Historical commit request 1: {Object 1, Object 2, Object 3}

Historical commit request 2: {Object 1, Object 3, Object 4}

Historical commit request 3: {Object 1, Object 4, Object 5}

At this point, since {Object 1, Object 2} only appears in historical commit request 1, thus support(S,H')=1.

According to an example implementation of the present disclosure, the above number of occurrences can be determined in various ways. For example, the number of occurrences can be determined based on a comparison approach. For another example, the number of occurrences can be determined based on the FP-Tree (Frequent Pattern Tree). The FP-Tree is an algorithm that has been proposed for determining frequently occurring patterns in a sample data set. The FP-Tree can be constructed based on the commit history, and thus the number of occurrences can be determined in a faster and more effective way.

According to an example implementation of the present disclosure, association relationship 220 may include association relationships between candidate object 210 and various subsets of the group of objects. Specifically, reference can be made to FIG. 5, which schematically illustrates a block diagram of process 500 for determining an association relationship between a candidate object and a subset of a group of objects according to an example implementation of the present disclosure. Specifically, subset 510 of the group of objects can be determined first, and then association relationship 220 between each candidate object 210 in a set of candidate objects 430 and subset 510 of the group of objects 122 can be determined. A similar processing can be performed for each subset in order to find a potential missing object associated with the subset.

Assuming that the group of objects 122 includes multiple objects 512, . . . , 514, . . . , and 516, multiple candidate subsets of the group of objects 122 can be determined. For example, multiple candidate subsets can be determined in an ascending order based on the numbers of objects included in the candidate subsets. Specifically, a candidate subset including one object can be determined, a candidate subset including two objects can be determined, . . . , and a candidate subset including all objects can be determined. It will be understood that, because of the large computational amount involved in the process of determining association relationship 220, filtering can be performed on the multiple candidate subsets to exclude subsets that do not contribute to finding missing objects.

Figure 5:
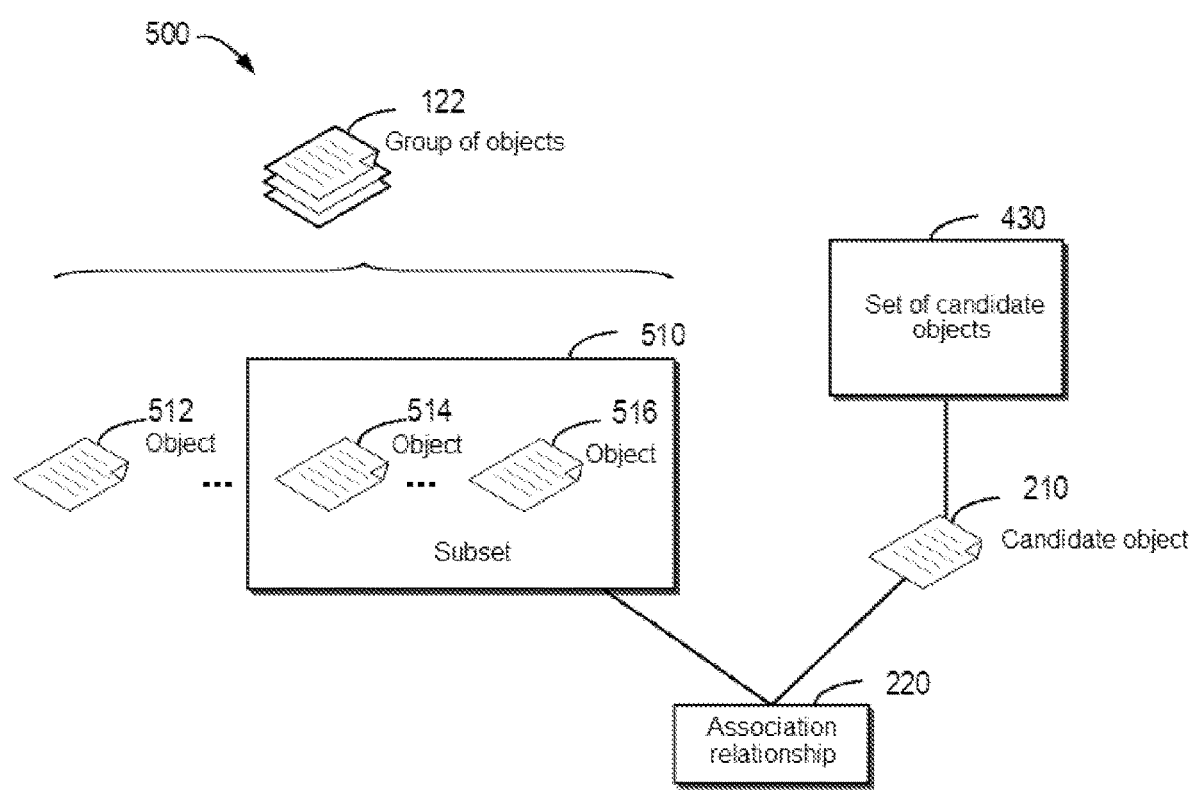
FIG. 5 schematically illustrates a block diagram of a process for determining an association relationship between a candidate object and a subset of a group of objects according to an example implementation of the present disclosure.

According to an example implementation of the present disclosure, the degree of support of each candidate subset relative to the group of historical commit requests can be determined respectively. If the degree of support is higher than a predetermined support degree threshold, the candidate subset is added to a subset of the group of objects. As shown in FIG. 5, subset 510 may include objects 514, . . . , and 516, and at this point, the degree of support of subset 510 relative to the group of historical commit requests 420 can be used to determine whether to perform further operations on subset 510. A threshold number can be specified in advance. For example, the threshold number can be set to 3

(or other values). At this point, if the number of previous occurrences of subset 510 in the group of historical commit requests 420 is higher than 3, the association relationship between subset 510 and candidate object 210 is further determined. Otherwise, if the number of occurrences is not higher than 3, this subset 510 can be discarded and the next subset can be further processed.

Assuming that the degree of support of subset 510 is 10 (10>3), then the method continues to determine association relationship 220 between subset 510 and candidate object 210. With the example implementation of the present disclosure, the number of subsets to be processed can be reduced, thus reducing the computational amount of subsequent operations.

According to an example implementation of the present disclosure, the concept of confidence level is proposed. The confidence level herein indicates the likelihood of candidate object 210 being a missing object. Specifically, candidate object 210 can be added to subset 510 to form a new subset, and at this point, the new subset may include object 514, . . . , object 516, and candidate object 210. Further, a degree of support of subset 510 relative to the group of historical commit requests 420 and a new degree of support of the new subset relative to the group of historical commit requests 420 can be determined respectively. Further, the confidence level can be determined based on the degree of support and the new degree of support. According to an example implementation of the present disclosure, the confidence level can be determined based on the following Equation 3.

$$\text{confidence }(S, f, H') = \frac{\text{support }(S \cup \{f\}, H')}{\text{support }(S, H')} \quad \text{Equation 3}$$

where S denotes subset 510, f denotes candidate object 210, H' denotes the group of historical commit requests 420, and confidence(S,f,H') denotes the confidence level of the new subset obtained after f is added to S. Specifically, the numerator part represents the degree of support of the new subset relative to H' obtained after f is added to S, and the denominator part represents the degree of support of the subset S relative to H'. Assuming that the degree of support of the new subset is 9, i.e., the new subset S∪{f} has appeared in H' 9 times, the confidence level at this point $$\text{confidence }(S, f, H') = \frac{9}{10} = 0.9.$$

It will be understood that processing for subset 510 of the group of objects 122 and candidate object 210 in the set of candidate objects 430 has been described above with reference to FIG. 5 and Equation 3 only. Each subset of the group of objects 122 and each candidate object in the set of candidate objects 430 can be processed in a similar manner. For example, each subset and each candidate object can be used to form a binary group (subset, candidate object), and the above Equation 3 can be used to determine the confidence level associated with each binary group as association relationship 220.

According to an example implementation of the present disclosure, the set of candidate objects 430 can be set to include all of the candidate objects that are involved by the group of historical commit requests 420 and are not in the group of objects 122. For example, the set of candidate objects 430 can be determined based on Equation 4 as follows:

$$F_{cand} \leftarrow \{f | f \notin S_{new}, f \in \cup_{S_{PR} \in H'} S_{PR}\} \quad \text{Equation 4}$$

where $F_{cand}$ denotes the set of candidate objects 430, condition 1 "$f \notin S_{new}$" denotes that the objects in the set of candidate objects are not in the group of objects 122 ($S_{new}$) involved by current commit request 120, and condition 2 "$f \in \cup_{S_{PR} \in H'} S_{PR}$" denotes that the objects in the set of candidate objects are in the various sets of historical objects involved by the group of historical commit requests 420.

According to an example implementation of the present disclosure, in order to reduce the number of candidate objects included in the set of candidate objects 430, the set of candidate objects 430 can be further filtered based on the support degree threshold (e.g., 3). Specifically, the set of candidate objects 430 can be determined based on Equation 5 as follows:

$$F_{cand} \leftarrow \{f | f \notin S_{new}, f \in \cup_{S_{PR} \in H'} S_{PR}, \text{support}(\{f\}, H') \geq n*c\} \quad \text{Equation 5}$$

where $F_{cand}$ denotes the set of candidate objects 430, and condition 1 "$f \notin S_{new}$" and condition 2 "$f \cup_{S_{PR} \in H'} S_{PR}$" have the same meaning as in Equation 4. In condition 3 "support ({f}, H')≥n*c" in Equation 5, n denotes the support degree threshold (e.g., 3), c denotes the confidence level threshold (e.g., 80%), and at this point, condition 3 indicates that the degree of support of candidate object f relative to the group of historical commit requests should be greater than or equal to n*c. Using condition 3, the candidate objects of which the numbers of historical occurrences are lower than n*c can be filtered out from the set of candidate objects. In this way, the number of objects in the set of candidate objects 430 can be reduced, thus reducing the computational amount of subsequent operations.

According to an example implementation of the present disclosure, each object in the set of candidate objects 430 can be traversed to determine the candidate object. In other words, for each object in the set of candidate objects 430, association relationship 220 between that object and each subset of the group of objects 122 can be determined.

Returning to FIG. 3, at block 340, in response to determining that the association relationship satisfies a predetermined condition, the candidate object is added to the set of missing objects 230, wherein the set of missing objects 230 represent potential missing objects in the software development project that are not in the group of objects 122. The specific process of determining association relationship 220 based on the confidence level has been described above, and at this point, the determined association relationship 220 can be compared with the predetermined threshold to determine whether the candidate object is a potential missing object. If the determined association relationship 220 is higher than the predetermined threshold (e.g., 80% or other values), candidate object 210 is considered as a potential missing object, and this candidate object 210 is added to the set of missing objects 230. With the example implementation of the present disclosure, potential missing objects can be found in a convenient and fast manner, thus reducing the workload of manual processing. According to an example implementation of the present disclosure, the set of missing objects 230 can be initially set to an empty set (i.e., $F_{res}$=0), and potential missing objects can be continuously added to the set of missing objects 230.

According to an example implementation of the present disclosure, all candidate objects in the set of candidate objects 430 can be processed in order. For example, association relationship 220 between the first candidate object and each subset can be determined first. If the association relationship between the first candidate object and any subset is lower than the predetermined threshold (e.g., 80%), this indicates that the first candidate object is not a potential missing object and the first candidate object can be removed from the set of candidate objects 430. If the association relationship between the first candidate object and one subset is higher than the predetermined threshold (e.g., 80%), this indicates that the first candidate object is a potential missing object and can be added to the set of missing objects 230, and the first candidate object can be removed from the set of candidate objects 430.

Thereafter, similar processing can be performed for subsequent candidate objects in the set of candidate objects 430 to determine whether the subsequent candidate objects are potential missing objects. According to an example implementation of the present disclosure, the objects in the set of candidate objects 430 can be processed continuously until all objects have been processed.

According to an example implementation of the present disclosure, if the set of candidate objects is empty finally, it means that all candidate objects have been processed and the set of missing objects 230 have included all potential missing objects. At this point, this set of missing objects 230 can be provided to the software engineer. With the example implementation of the present disclosure, objects that may be missing in commit request 120 can be quickly found to prompt the software engineer to manually check if commit request 120 needs to be updated.

According to an example implementation of the present disclosure, an object can include at least any one of a directory and a file in the software development project. In this case, the directory or the path to the file can be used as the unique identifier of the object. It will be understood that the path may include a large number of character strings, which results in a large storage space occupied by the identifier of the object and low processing efficiency. According to an example implementation of the present disclosure, the above path can be first mapped to a short numeric identifier, and the numeric identifier can be used to represent the object. Assuming that the path to an object is "path/to/checks/tools/platform.pm," the path can be mapped to a 64-bit (or another number of bits) identifier. In this way, the storage space for the identifier of each object can be greatly saved on the one hand, and the relevant computational performance can be improved on the other hand.

Figure 6:
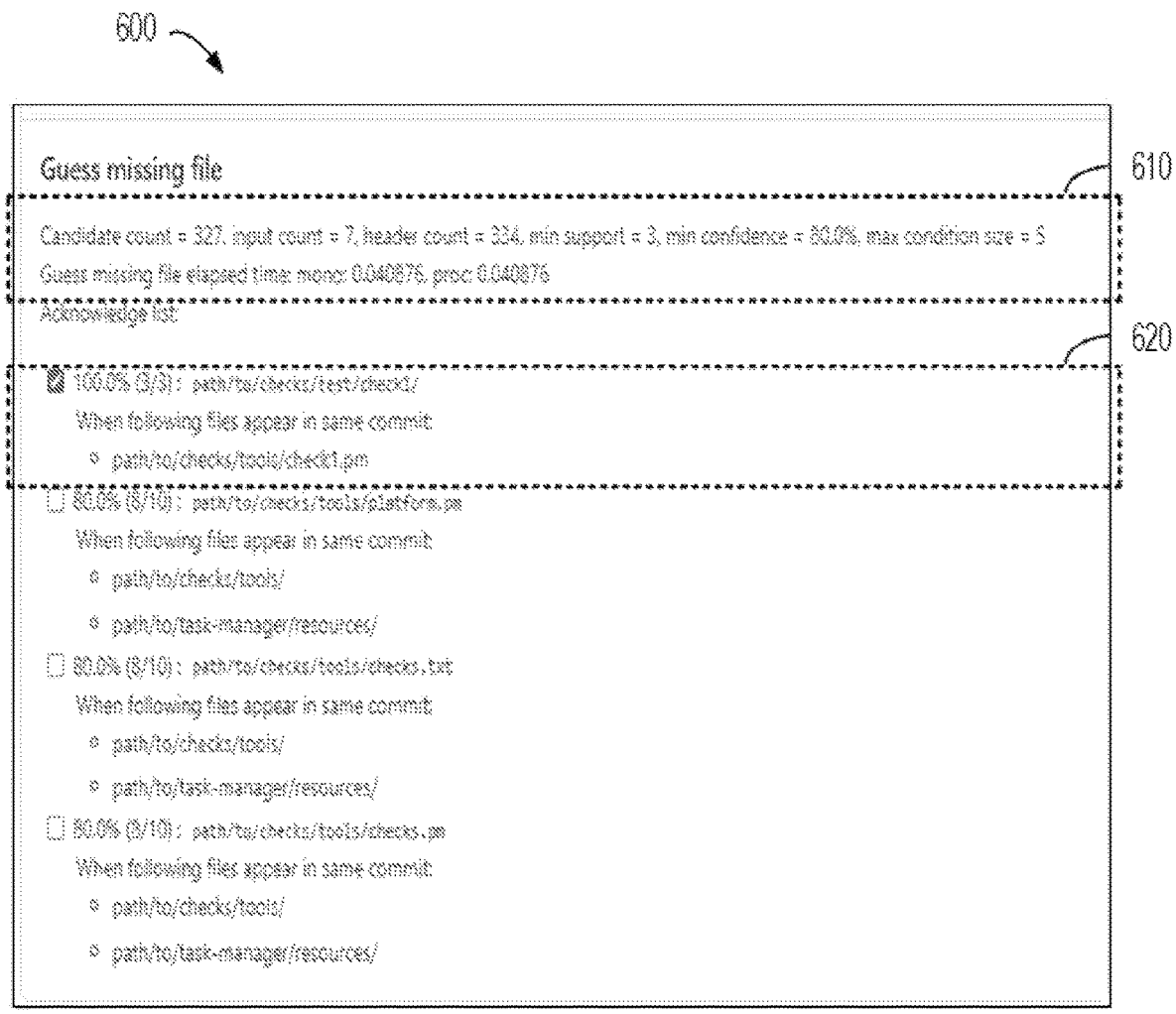
FIG. 6 schematically illustrates a block diagram of a user interface for displaying a set of missing objects according to an example implementation of the present disclosure.

Hereinafter, reference can be made to FIGS. 6 and 7 for the description of more details for displaying the missing objects. FIG. 6 schematically illustrates a block diagram of user interface 600 for displaying a set of missing objects according to an example implementation of the present disclosure. As shown in FIG. 6, region 610 represents multiple configuration parameters during the execution of method 300 described above. For example, the parameter "candidate count=327" means that the number of candidate objects included in the set of candidate objects is 327, the parameter "min support=3" means that the support degree threshold is 3, the parameter "min confidence=80%" means that the confidence level threshold is 80%, and so on. Region 620 indicates relevant information of a potential missing file. For example, "100.00%" means that the relevant confidence level is 100, and the values of the numerator and denominator when determining the confidence level are "3/3" respectively. "path/to/checks/test/check1/" indicates the path to the missing object and that this potential missing object was previously committed together with the object "path/to/checks/tools/check1.pm". Three other potential missing objects are also shown in FIG. 6, all of which have a relevant confidence level of 80%.

FIG. 7 schematically illustrates a block diagram of user interface 700 for displaying a set of missing objects according to an example implementation of the present disclosure. The meanings of various regions in this user interface are similar to those shown in FIG. 6 and thus will not be repeated. With the example implementation of the present disclosure, potential missing objects can be provided to the software engineer in a graphical manner. Further, the software engineer can determine the next action based on the contents of FIG. 6 and FIG. 7. For example, the software engineer can update commit request 120 based on the prompted missing file. For another example, if it is found after careful examination that the current software update does not involve the prompted missing file, the software engineer can mark the prompted missing file as "error."

With the example implementation of the present disclosure, FIGS. 6 and 7 may include detailed information related to potential missing objects so that the software engineer can understand why a certain object is marked as a potential missing file. Further, the detailed information can also help the software engineer find connections between objects and avoid similar errors in the next commit request.

Figure 8:
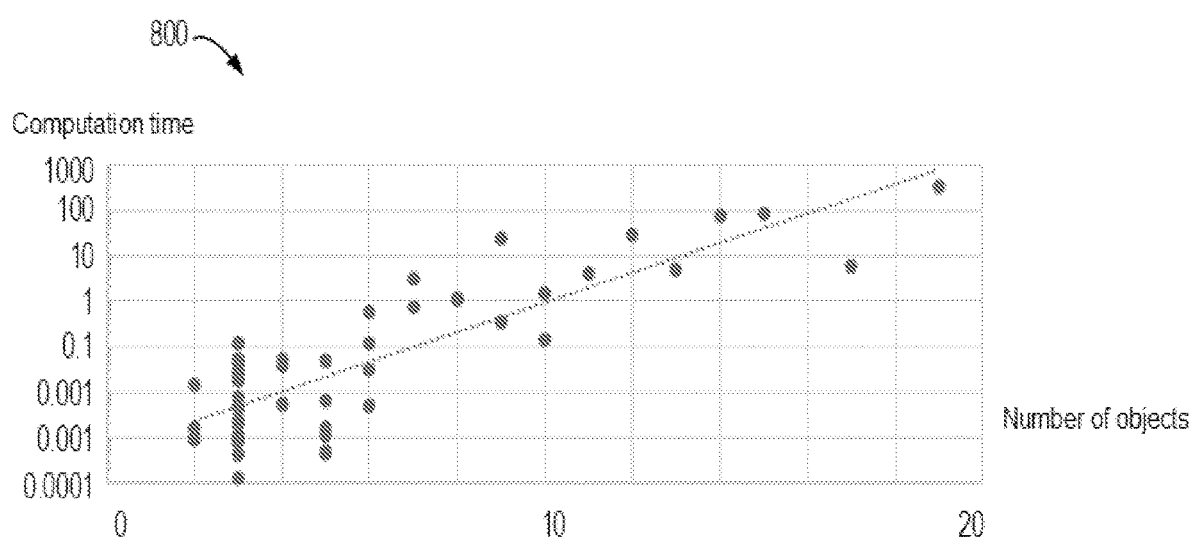
FIG. 8 schematically illustrates a block diagram of a time distribution for determining a set of missing objects according to an example implementation of the present disclosure.

As described above, according to an example implementation of the present disclosure, filtering may be performed respectively for commit history 130, the set of candidate objects 430, and multiple subsets of the group of objects 122 to reduce the amount of data to be processed and thereby improve the processing performance. Thus, with the example implementation of the present disclosure, the set of missing objects 230 can be obtained within an acceptable length of time. FIG. 8 schematically illustrates block diagram 800 of a time distribution for determining a set of missing objects according to an example implementation of the present disclosure. In FIG. 8, the horizontal coordinate illustrates the number of objects included in commit request 120, and the vertical coordinate illustrates the time (in seconds) required to determine the relevant set of missing objects 230. FIG. 8 illustrates experimental data of a process of determining the corresponding set of missing objects for 50 commit requests. It can be found that the larger the number of objects, the longer the computation time, and for most of the commit requests 120, the processing time is less than 100 seconds.

With the example implementation of the present disclosure, potential missing objects can be determined by mining the association relationship between the various objects in the commit history. In this way, the entire process is automated and does not require manual annotation of data. As opposed to existing technical solutions that require a completely manual process, with the example implementation of the present disclosure, it is possible to automatically obtain potential missing objects, thereby improving reliability of the software development technology as well as reducing the manual labor load on software engineers.

The examples of the method according to the present disclosure have been described in detail above with reference to FIGS. 2 to 8, and the implementations of a corresponding apparatus will be described below. According to an example implementation of the present disclosure, an apparatus for managing objects in a software development project is provided. This apparatus includes: an acquiring module configured to acquire, in response to receiving a commit request for committing a group of objects in the software development project, a group of historical commit requests associated with the group of objects based on a commit history of the software development project, wherein historical commit requests in the group of historical commit requests involve the group of objects; a selecting module configured to select a candidate object from at least one object involved in the historical commit requests that is different from the group of objects; a determining module configured to determine an association relationship between the candidate object and the group of objects; and an identifying module configured to identify the candidate object as a missing object in response to determining that the association relationship satisfies a predetermined condition, wherein the missing object indicates an object associated with the commit request but not included in the commit request. According to an example implementation of the present disclosure, this apparatus further includes modules for performing other steps in method 300 described above.

Figure 9:
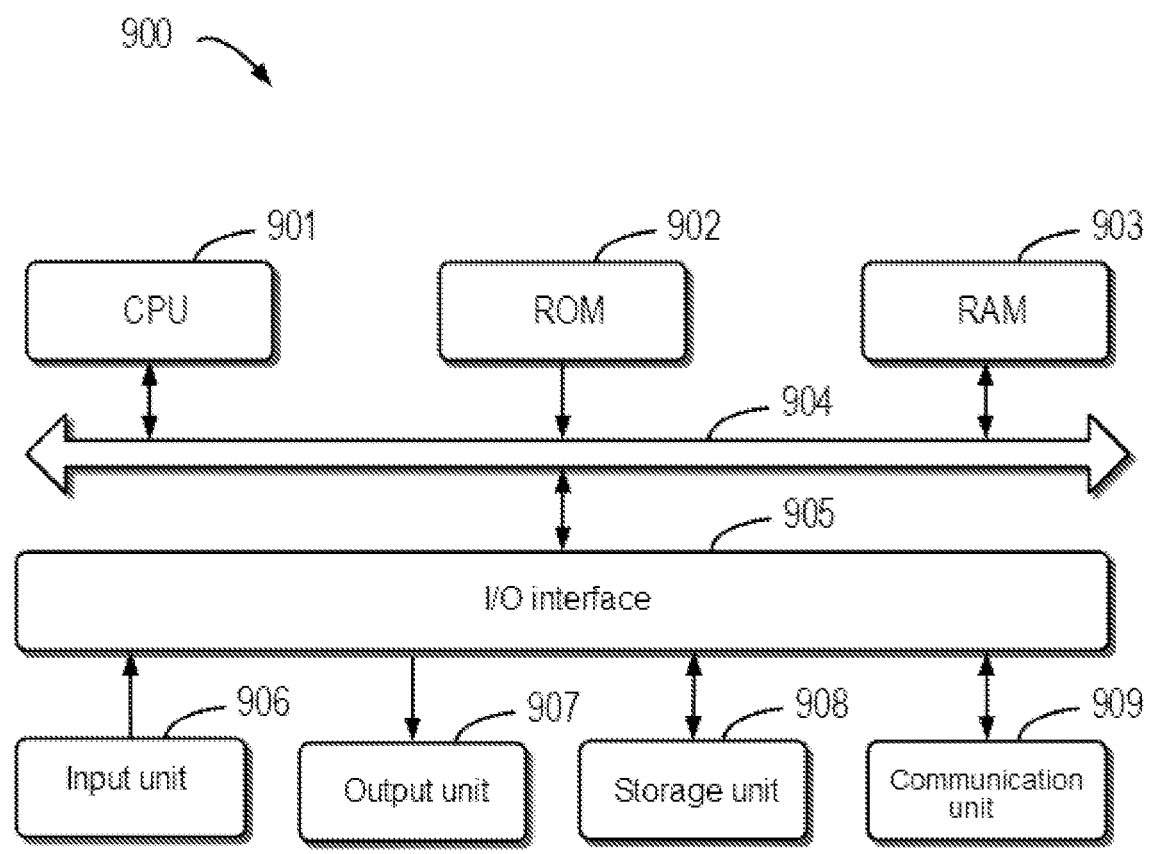
FIG. 9 schematically illustrates a block diagram of a device for managing objects in a software development project according to an example implementation of the present disclosure.

FIG. 9 schematically illustrates a block diagram of device 900 for managing data patterns according to an example implementation of the present disclosure. As shown in the figure, device 900 includes central processing unit (CPU) 901 that may execute various appropriate actions and processing according to computer program instructions stored in read-only memory (ROM) 902 or computer program instructions loaded from storage unit 908 into random access memory (RAM) 903. Various programs and data required for the operation of device 900 may also be stored in RAM 903. CPU 901, ROM 902, and RAM 903 are connected to each other through bus 904. Input/output (I/O) interface 905 is also connected to bus 904.

Multiple components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various processes and processing described above, such as method 300, may be executed by processing unit 901. For example, in some implementations, method 300 may be implemented as a computer software program that is tangibly included in a machine-readable medium, such as storage unit 908. In some implementations, part or all of the computer program may be loaded and/or installed on device 900 via ROM 902 and/or communication unit 909. When the computer program is loaded into RAM 903 and executed by CPU 901, one or more steps of method 300 described above may be performed. Alternatively, in other implementations, CPU 901 may also be configured in any other suitable manner to implement the above-described process/method.

According to an example implementation of the present disclosure, an electronic device is provided, including: at least one processor; a volatile memory; and a memory coupled to the at least one processor, wherein the memory has instructions stored therein which, when executed by the at least one processor, cause the device to perform a method for managing objects in a software development project. This method includes: acquiring, in response to receiving a commit request for committing a group of objects in the software development project, a group of historical commit requests associated with the group of objects based on a commit history of the software development project, wherein historical commit requests in the group of historical commit requests involve the group of objects; selecting a candidate object from at least one object involved in the historical commit requests that is different from the group of objects; determining an association relationship between the candidate object and the group of objects; and identifying the candidate object as a missing object in response to determining that the association relationship satisfies a predetermined condition, wherein the missing object indicates an object associated with the commit request but not included in the commit request.

According to an example implementation of the present disclosure, acquiring a group of historical commit requests includes: for a historical commit request in the commit history, adding the historical commit request to the group of historical commit requests in response to determining that a group of historical objects involved by the historical commit request has an intersection with the group of objects.

According to an example implementation of the present disclosure, determining an association relationship includes: determining a subset of the group of objects; and determining an association relationship between the candidate object and the subset.

According to an example implementation of the present disclosure, determining a subset includes: determining a degree of support of a candidate subset in the group of objects relative to the group of historical commit requests, wherein the degree of support indicates the number of occurrences of the candidate subset in the group of historical commit requests; and adding the candidate subset to the subset of the group of objects in response to determining that the degree of support is higher than a predetermined support degree threshold.

According to an example implementation of the present disclosure, determining an association relationship between the candidate object and the subset includes: adding the candidate object to the subset to form a new subset; determining a degree of support of the subset relative to the group of historical commit requests and a new degree of support of the new subset relative to the group of historical commit requests, respectively; and determining the association relationship based on the degree of support and the new degree of support.

According to an example implementation of the present disclosure, selecting the candidate object includes: creating a set of candidate objects based on the at least one object; and traversing the set of candidate objects to determine the candidate object.

According to an example implementation of the present disclosure, the method further includes: in response to the candidate object having been selected, removing the candidate object from the set of candidate objects.

According to an example implementation of the present disclosure, the method further includes: adding the missing object to a set of missing objects; and providing the set of missing objects in response to the set of candidate objects being empty.

According to an example implementation of the present disclosure, an object in the group of objects includes at least any one of a directory and a file in the software development project.

According to an example implementation of the present disclosure, the method further includes: converting the path to the object to a numeric identifier; and using the numeric identifier to represent the object.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided, the computer-readable medium storing machine-executable instructions which, when being executed by at least one processor, cause the at least one processor to implement the method according to the present disclosure.

The present disclosure may be a method, a device, a system, and/or a computer program product. The computer program product may include a computer-readable storage medium having computer-readable program instructions for performing various aspects of the present disclosure loaded thereon.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read only memory (EPROM or flash memory), a static random access memory (SRAM), a portable compact disk read only memory (CD-ROM), a digital versatile disk (DVD), a memory stick, a floppy disk, a mechanical encoding device such as a punch card or a protruding structure within a groove having instructions stored thereon, and any suitable combination of the foregoing. The computer-readable storage medium as used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to the implementations of the present disclosure. It should be understood that each block of the flow charts and/or the block diagrams and combinations of the blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to multiple implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

The invention claimed is:

1. A method for controlling a software development system that manages objects in a software development project, the method comprising:
  acquiring, in response to a code base of the software development project receiving a commit request for committing a group of objects in the software development project, a group of historical commit requests associated with the group of objects based on a commit history of the software development project, wherein historical commit requests in the group of historical commit requests involve the group of objects;
  selecting a candidate object from at least one object involved in the historical commit requests that is different from the group of objects;
  selecting a subset of objects from the group of objects, the subset of objects including a plurality of objects, the group of objects including more objects than the subset of objects;
  identifying, from the group of historical commit requests, historical commit requests that include both the candidate object and the subset of objects;
  determining an association relationship between the candidate object and the group of objects, wherein determining the association relationship includes:
    generating the association relationship based on a total number of the historical commit requests that include both the candidate object and the subset of objects;
  wherein the method further comprises:
    identifying the candidate object as a missing object in response to determining that the association relationship satisfies a predetermined condition, said identifying including, in response to the association relationship indicating that the candidate object is a missing object, preventing the code base from executing the commit request without the candidate object and updating a user interface of the software development system to provide a mapped path to the candidate object and to receive user input through the user interface to include the candidate object in an updated commit request, wherein the missing object indicates an object associated with the commit request but not included in the commit request; and
    after identifying the candidate object as the missing object, executing, via computerized circuitry, an updated commit request to commit the group of objects and the missing object to the code base of the software development project.

2. The method according to claim 1, wherein acquiring the group of historical commit requests includes: for a historical commit request in the commit history,
  adding the historical commit request to the group of historical commit requests in response to determining that a group of historical objects involved by the historical commit request has an intersection with the group of objects.

3. The method according to claim 1, wherein determining the association relationship includes:
  determining a subset of the group of objects; and
  determining an association relationship between the candidate object and the subset.

4. The method according to claim 3, wherein determining the subset includes:
  determining a degree of support of a candidate subset in the group of objects relative to the group of historical commit requests, wherein the degree of support indicates the number of occurrences of the candidate subset in the group of historical commit requests; and
  adding the candidate subset to the subset of the group of objects in response to determining that the degree of support is higher than a predetermined support degree threshold.

5. The method according to claim 3, wherein determining an association relationship between the candidate object and the subset includes:
  adding the candidate object to the subset to form a new subset;
  determining a degree of support of the subset relative to the group of historical commit requests and a new degree of support of the new subset relative to the group of historical commit requests, respectively; and
  determining the association relationship based on the degree of support and the new degree of support.

6. The method according to claim 3, wherein selecting the candidate object includes:
  creating a set of candidate objects based on the at least one object; and
  traversing the set of candidate objects to determine the candidate object.

7. The method according to claim 6, further comprising: in response to the candidate object having been selected, removing the candidate object from the set of candidate objects.

8. The method according to claim 7, further comprising: adding the missing object to a set of missing objects; and providing the set of missing objects in response to the set of candidate objects being empty.

9. The method according to claim 1, wherein an object in the group of objects includes at least any one of a directory and a file in the software development project.

10. The method according to claim 9, further comprising: converting the path to the object to a numeric identifier; and
  using the numeric identifier to represent the object.

11. The method according to claim 1, further comprising:
  receiving the commit request within an application environment of the software development project, the application environment running on the computerized circuitry and including the code base; and
  wherein executing the updated commit request includes:
    receiving the updated commit request within the application environment; and
    in response to receiving the updated commit request, inserting the group of objects and the missing object into the code base.

12. The method according to claim 1, wherein selecting the subset of objects includes:
   generating multiple subsets of objects from the group of objects, the multiple subsets including the subset of objects;
   performing a filtering operation on the multiple subsets, the filtering operation (i) assigning, to the multiple subsets, scores indicating respective degrees of support with the group of historical commit requests, and (ii) removing, from the multiple subsets, subsets with scores below a predetermined threshold; and
   after performing the filtering operation, providing the subset of objects from the multiple subsets.

13. The method of claim 1, wherein selecting the subset of objects from the group of objects includes:
   filtering candidate subsets of objects to exclude subsets based on respective numbers of historical commit requests that include the subsets, thereby reducing a total number of the candidate subsets of objects for which data processing is performed, the candidate subsets of objects being generated from the group of objects.

14. An electronic device, comprising:
   at least one processor;
   a volatile memory; and
   a memory coupled to the at least one processor, wherein the memory has instructions stored therein which, when executed by the at least one processor, cause the device to execute a method for controlling a software development system that manages objects in a software development project, the method including:
      acquiring, in response to a code base of the software development project receiving a commit request for committing a group of objects in the software development project, a group of historical commit requests associated with the group of objects based on a commit history of the software development project, wherein historical commit requests in the group of historical commit requests involve the group of objects;
      selecting a candidate object from at least one object involved in the historical commit requests that is different from the group of objects;
      selecting a subset of objects from the group of objects, the subset of objects including a plurality of objects, the group of objects including more objects than the subset of objects;
      identifying, from the group of historical commit requests, historical commit requests that include both the candidate object and the subset of objects;
      determining an association relationship between the candidate object and the group of objects; wherein determining the association relationship includes:
         generating the association relationship based on a total number of the historical commit requests that include both the candidate object and the subset of objects;
      wherein the method further comprises:
         identifying the candidate object as a missing object in response to determining that the association relationship satisfies a predetermined condition, said identifying including, in response to the association relationship indicating that the candidate object is a missing object, preventing the code base from executing the commit request without the candidate object and updating a user interface of the software development system to provide a mapped path to the candidate object and to receive user input through the user interface to include the candidate object in an updated commit request, wherein the missing object indicates an object associated with the commit request but not included in the commit request; and
         after identifying the candidate object as the missing object, executing, via computerized circuitry, an updated commit request to commit the group of objects and the missing object to the code base of the software development project.

15. The device according to claim 14, wherein acquiring the group of historical commit requests includes: for a historical commit request in the commit history,
   adding the historical commit request to the group of historical commit requests in response to determining that a group of historical objects involved by the historical commit request has an intersection with the group of objects.

16. The device according to claim 14, wherein determining the association relationship includes:
   determining a subset of the group of objects; and
   determining an association relationship between the candidate object and the subset.

17. The device according to claim 16, wherein determining the subset includes:
   determining a degree of support of a candidate subset in the group of objects relative to the group of historical commit requests, wherein the degree of support indicates the number of occurrences of the candidate subset in the group of historical commit requests; and
   adding the candidate subset to the subset of the group of objects in response to determining that the degree of support is higher than a predetermined support degree threshold.

18. The device according to claim 16, wherein determining an association relationship between the candidate object and the subset includes:
   adding the candidate object to the subset to form a new subset;
   determining a degree of support of the subset relative to the group of historical commit requests and a new degree of support of the new subset relative to the group of historical commit requests, respectively; and
   determining the association relationship based on the degree of support and the new degree of support.

19. The device according to claim 16, wherein selecting the candidate object includes:
   creating a set of candidate objects based on the at least one object; and
   traversing the set of candidate objects to determine the candidate object.

20. The device according to claim 19, wherein the method further includes: in response to the candidate object having been selected, removing the candidate object from the set of candidate objects.

21. The device according to claim 20, wherein the method further includes:
   adding the missing object to a set of missing objects; and
   providing the set of missing objects in response to the set of candidate objects being empty.

22. The device according to claim 14, wherein an object in the group of objects includes at least any one of a directory and a file in the software development project, and the method further includes:
   converting the path to the object to a numeric identifier; and
   using the numeric identifier to represent the object.

23. A computer program product having a non-transitory computer readable medium which stores a set of instructions to control a software development system that manages objects in a software development project; the set of instructions, when carried out by computerized circuitry, causing the computerized circuitry to perform a method of:

- acquiring, in response to a code base of the software development project receiving a commit request for committing a group of objects in the software development project, a group of historical commit requests associated with the group of objects based on a commit history of the software development project, wherein historical commit requests in the group of historical commit requests involve the group of objects;
- selecting a candidate object from at least one object involved in the historical commit requests that is different from the group of objects;
- selecting a subset of objects from the group of objects, the subset of objects including a plurality of objects, the group of objects including more objects than the subset of objects;
- identifying, from the group of historical commit requests, historical commit requests that include both the candidate object and the subset of objects;
- determining an association relationship between the candidate object and the group of objects; wherein determining the association relationship includes:
  - generating the association relationship based on a total number of the historical commit requests that include both the candidate object and the subset of objects;

wherein the method further comprises:

- identifying the candidate object as a missing object in response to determining that the association relationship satisfies a predetermined condition, said identifying including, in response to the association relationship indicating that the candidate object is a missing object, preventing the code base from executing the commit request without the candidate object and updating a user interface of the software development system to provide a mapped path to the candidate object and to receive user input through the user interface to include the candidate object in an updated commit request, wherein the missing object indicates an object associated with the commit request but not included in the commit request; and
- after identifying the candidate object as the missing object, executing, via computerized circuitry, an updated commit request to commit the group of objects and the missing object to the code base of the software development project.

\* \* \* \* \*